United States Patent Office 3,170,783
Patented Feb. 23, 1965

3,170,783
METHOD OF PRE-EMERGENTLY CONTROLLING PLANTS
Ray D. Amburn, Mount Pleasant, Mich., assignor, by mesne assignments, to Vesely Company, Lapeer, Mich., a corporation of Michigan
No Drawing. Filed Oct. 25, 1961, Ser. No. 147,478
4 Claims. (Cl. 71—2.3)

The invention relates to a composition useful for various agricultural purposes such, for example, as a herbicidal product. One important herbicidal product for which my invention is ideally adapted is a weed killing product which can be spread upon growing vegetation.

In recent years it has become increasingly important to provide products serving as weed killers for grass lawns. One of the weeds which has been most difficult to eradicate or control is crab grass. Prior to my invention, chemicals have been developed which are quite capable of killing crab grass without harming the desired grass species in a lawn but their practical application has not been entirely successful. The theory has been evolved that crab grass can best be eradicated by applying an active chemical to the seed while it is on the ground and certain chemicals are available which are capable of destroying the crab grass plant. Some chemicals act on the plant after it has sprouted but before it has grown to maturity while other chemicals have been developed which will destroy the crab grass plant while it is still within the seed. The art has been developed to the stage where active chemicals having herbicidal properties are classified as pre-emergence herbicides or post-emergence herbicides. Pre-emergence is defined as the condition of a plant before the seed sprouts. Thus, a pre-emergence herbicide is one capable of killing the seed before the plant emerges.

One of the important uses for my invention is to provide a practical product for application to lawns or other forms of vegetation utilizing an active chemical substance having pre-emergence herbicidal properties. My research has been directed to the problem of finding the proper carrier material for the various pre-emergence herbicides so that the composition having both the carrier and the active ingredient will function properly in the intended manner. I have discovered a composition containing active and carrier ingredients which is far superior to the compositions of the prior art.

The carrier ingredient of my invention is derived from corncobs. I have discovered a corncob product having previously unknown or unrecognized characteristics and I have combined with this corncob product an active ingredient thereby producing an entirely novel composition useful for many agricultural purposes. More specifically, I have produced a novel composition which is a practical, effective material of commerce, which functions effectively as a crab grass killer and which can be packaged, transported, sold and used in an economical manner for the purpose intended.

A corncob has three primary constituents or fractions. At the core of a cob is the pith, which is a white, granular, stringy substance that is soft, spongy, and light in weight. It represents about 10 percent of the cob volume, but only about 2 percent of its weight. Surrounding the pith is a dense woody portion of the cob which is generally a ring about ¼ inch thick. Surrounding the dense, woody ring constituent is the glume, which is the chaffy lining for the stockets of the kernels of corn.

The dense character of the hard woody inner ring constituent makes it rather resistant to granulation or abrasion. This portion of the cob represents about 60 percent of its total weight. The balance of the cob is made up of fine and coarse chaff (4 percent fine, 34 percent coarse). Most of the coarse chaff is made up of what is called the outer glume, a tough substance at the base of the kernel next to the woody ring. The fine chaff, otherwise known as beeswing, makes up the inner glume; that is, the upper section of the outer glume. It is very light in weight and may be separated easily from the balance of the cob.

The carrier ingredient of my improved composition comprises a woody constituent of high density substantially free from other constituents of lower density. The corncob product of the present invention has a density in the range between 22 pounds per cubic foot to 30 pounds per cubic foot, the optimum density being approximately 28 pounds per cubic foot. This product is harder than ordinary hardwood and contains no resin. Desirably, it is so prepared as to have very little moisture content and it is of such a degree of fineness and regularity that it will spread easily on a lawn. However, it is also of such uniformity and density that it is not retained for any considerable length of time on the foliage but sinks through the foliage into the ground where it comes into intimate contact with the seeds which are in the ground preparatory to germination.

The corncob constituent utilized in my invention can be obtained from corncobs by separating the heavier constituents from the lighter either by mechanical means or in some other suitable way. One method for obtaining the corncob product of this invention can be described generally as follows.

Corncobs are obtained from commercial sources such as elevators, grain handling depots and other points where large supplies of corncobs are available. In the central processing plant where my product is to be obtained, the corncobs are fed into a conveyor where the husks are removed in the manner known to the art. From the husk remover the corncobs are fed into mechanical reduction machinery to reduce the size sufficiently so that excess moisture can be removed economically by artificial drying. Apparatus for this purpose is known to the art and consists usually of a hammer mill, cutting rolls, attrition mills, etc. After this first reduction in size, the corncobs are fed into a drying drum or furnace in the manner known to the art. The moisture is reduced to acceptable limits which normally are between 3% to 10% moisture. The amount of moisture retained in the material depends to a certain extent upon the chemical which is later incorporated into the final composition.

From the drying operation, the corncobs are put through a separator to remove part of the undesirable portion that has been separated during the first reduction. This separation removes one of the lighter constituents which may be referred to as the pith. This light constituent is undesirable for the purposes of the present invention. After such removal, the remaining portion of the comminuted corncobs are processed through a device to scour or rub off the remainder of the lightweight material. Apparatus for accomplishing this result is known. The lightweight material thus separated from the heavier constituents of the corncobs must then be completely removed. Such removal can be effected by further processing with controlled air in an aspirator. The lightweight portions removed in the aspirator are sometimes referred to in the art as comprising the outer glume and the beeswing constituents of the corncob.

After removal of the lighter constituents by means of the aspirator, the remaining heavier portions of the corncobs are processed through reducing machinery until the desired final size is reached. Ordinarily this may require from 3 to 6 separate reductions with a screening operation after each reduction. When the proper size is reached (8 mesh screen to 100 mesh screen U.S.S.) the comminuted product is put through the final aspirator to remove any particle of less density than that desired. The final screening size is controlled as desired dependent upon the purpose for which the carrier agent is to be ultimately used.

When corncobs are processed as outlined above, three distinct products are obtained. The first material which is separated during the process and designated above as pith weights about 14 pounds per cubic foot. The second type of material which is removed subsequently to the scouring and rubbing operation weighs approximately 8 to 10 pounds per cubic foot. The final product which is utilized for the present invention has a density of 22 pounds to 30 pounds per cubic foot.

This final corncob product which can be prepared by the process outlined above, is somewhat difficult to describe satisfactorily by mere language. The optimum density of the product is 28 pounds per cubic foot. It is a free flowing granular product, all particles of which will pass through an 8 mesh screen and none of which will pass through a 100 mesh screen. In general, the individual grains of the carrier are of quite regular contour and size. The grains are smooth and round relatively free from sharp corners. The particles, while not spherical, are not elongated and in general the major axis is less than twice that of the minor axis although such granular characteristic is not absolutely essential. The product when in bulk form flows readily like dry sand and resembles sand somewhat in its physical characteristics.

According to my invention the corncob product described above is impregnated with an active chemical. It is important that each and every particle of the carrier material be covered or saturated with the active chemical. This can be accomplished in a known manner. One desirable method is to place an accurately measured amount of the carrier in a mixer to which is then added an accurately measured amount of the active material dissolved in a liquid or suspended in a liquid. The combined ingredients are then mixed for a sufficient length of time to insure uniformity. Preferably, it is desirable to add a coloring or dyeing agent to the active chemical so that it can readily be determined by inspection as to the degree of uniformity of distribution of the active material through the carrier agent. If desired, the active material can be sprayed on to the carrier material. The combining of carrier and active material to produce a uniform final product is very important in order to produce a final product of quality. On the other hand, the present invention does not reside in the specific mixing of the ingredients but rather in the discovery of the combination of the ingredients themselves. Because of the previously unknown or unrecognized properties of the particular constituent of corncobs processed as above described, the intimate mixture of active ingredient and granular corncob product performs agricultural functions that are greatly superior to any product of the prior art.

The active materials included within the present invention are in general classified as herbicides or pesticides. The invention in its broader aspects includes active herbicidal or pesticidal ingredients that are themselves known in the art. More particularly, the present invention relates to a product wherein the corncob carrier product is combined with a pre-emergence herbicide. As stated above, this term has acquired a recognized status in the art and is not restricted to any particular chemical. Examples of pre-emergence herbicides are the following:

(1) O-(2.4-dichlorophenyl) O-methyl isopropylphosphoramidothioate.

(2) Dimethyl ester of tetrachloroterephthalic acid.

The first mentioned chemical is commercially available under the trademark Zytron manufactured by Dow Chemical Company. The chemical listed as No. 2 above is available commercially under the trademark Dacthal manufactured by Diamond Alkali Company. Other products of a similar functional nature are commercially available such, for example, as Bundane by Velsicol and pre-emergence herbicides of Eli Lilly & Company and Upjohn Company. Any other chemical substance having the property of attacking and killing the plant prior to its emergence from the seed can also be utilized with the carrier of the present invention.

The invention contemplates also active materials which can be classified as post-emergence herbicides. Furthermore, active materials outside of the above two specific classifications can also be utilized with the carrier agent of the present invention.

If desired, the product may have incorporated therein as an additional ingredient a certain amount of fertilizer. It should also be noted that the corncob product of the present invention is itself organic in nature and is a desirable agricultural product for application to lawns or other foliage or agricultural fields. Where desirable, the corncob product can have added thereto as an additional fertilizing ingredient liquid nitrogen, liquid phosphorus, liquid potassium, etc. Such liquid material can be incorporated at the same time that the active chemical is mixed with the corncob product or it can also be later incorporated as a separate operation.

Again referring to the corncob carrier ingredient of the invention, it may be described as the hard inner ring constituent of the corncob substantially free from the light furfural materials. It has the desirable property of being able to retain chemical activity on the individual grains. Its density is neither too light nor too heavy for its use in combination with a pre-emergence herbicide.

According to another feature of the invention, the corncob carrier ingredient may be used in association with a liquid fertilizer without any herbicidal agent. For this purpose any suitable water soluble fertilizer may be used containing nitrogen, phosphorus and potassium in the desired proportions. Fertilizers of this nature are commercially available under various designations which usually refer to the relative proportions of the three elements, nitrogen, phosphorus and potassium. Nitrogen can be obtained, for example, by means of urea or aqueous ammonia. Phosphorus is available as phosphoric acid, and potassium is available in many forms, as an anion in many organic and inorganic materials.

As previously mentioned, the invention includes a composition containing active herbicidal or pesticidal ingredients. These may be present in the corncob carrier constituent in a wide range of proportions depending upon the particular agricultural purpose. In general, the amount of active material present in the combination can range from ¼ of 1% or less to 25% or more. In the case of the pre-emergence herbicides heretofore mentioned by a chemical name, the first which is sold as Zytron can be incorporated with the corncob constituent in accordance with the following standards. The amount of active material should be present between 4.0% and 5.0% with an optimum amount 4.3% by weight. In the case of the second chemical sold under the trademark Dacthal, a desirable specification limits the active ingredient to the range between 2.0% and 3.0% with an optimum amount 2.5% by weight.

Another composition coming within the purview of the present invention is one containing 25% by weight of chlordane and 75% of the woody constituent of the corncobs previously described.

What I claim as my invention is:

1. The method of pre-emergently controlling plant life which comprises applying to the area bearing said plant life a herbicidally effective amount of a solid granular material having deposited thereon from 0.25 to 25 percent by weight of a pre-emergence herbicide, said granular material comprising the hard inner ring constituent of corncobs substantially free from other constituents thereof, of a particle size between 8 and 100 mesh, a moisture content between 3 percent and 10 percent by weight, and a density between 22 and 30 pounds per cubic foot.

2. The method of claim 1 wherein said pre-emergence herbicide is capable of killing crabgrass prior to its emergence from the seed.

3. The method of claim 1 wherein said pre-emergence herbicide is O-(2,4-dichlorophenyl) O-methyl isopropylphosphoramidothioate.

4. The method of claim 1 wherein said pre-emergence herbicide is dimethyl ester of tetrachloroterephthalic acid.

References Cited by the Examiner

UNITED STATES PATENTS

| | | | |
|---|---|---|---|
| 2,890,151 | 6/59 | White | 167—42 |
| 2,974,030 | 3/61 | Geary | 71—3 |
| 3,030,734 | 4/62 | Brickey | 167—42 |
| 3,074,845 | 1/63 | Geary. | |

OTHER REFERENCES

Shenefelt: "Jr. Economic Entomology," vol. 45, October 1952, page 895.

LEWIS GOTTS, *Primary Examiner.*

M. A. BRINDISI, J. S. LEVITT, *Examiners.*